US011681585B2

(12) United States Patent
Kludy et al.

(10) Patent No.: US 11,681,585 B2
(45) Date of Patent: *Jun. 20, 2023

(54) DATA MIGRATION FOR A SHARED DATABASE

(71) Applicant: Citrix Systems, Inc., Fort Lauderdale, FL (US)

(72) Inventors: Thomas Michael Kludy, Cooper City, FL (US); Michael Paul Wehniainen, Margate, FL (US)

(*) Notice: Subject to any disclaimer, the term of this patent is extended or adjusted under 35 U.S.C. 154(b) by 117 days.

This patent is subject to a terminal disclaimer.

(21) Appl. No.: 17/079,717

(22) Filed: Oct. 26, 2020

(65) Prior Publication Data

US 2021/0042196 A1 Feb. 11, 2021

Related U.S. Application Data

(63) Continuation of application No. 15/595,885, filed on May 15, 2017, now Pat. No. 10,824,511.

(51) Int. Cl.
*G06F 11/14* (2006.01)
*G06F 16/21* (2019.01)
(Continued)

(52) U.S. Cl.
CPC ...... *G06F 11/1451* (2013.01); *G06F 11/1461* (2013.01); *G06F 11/3006* (2013.01);
(Continued)

(58) Field of Classification Search
CPC ............ G06F 11/1451; G06F 16/2329; G06F 16/214; G06F 11/1461; G06F 11/3006;
(Continued)

(56) References Cited

U.S. PATENT DOCUMENTS 7,155,462 B1 * 12/2006 Singh ..................... G06F 8/65
707/999.203
2004/0267796 A1 * 12/2004 Shimogori .......... G06F 16/9027
(Continued)

OTHER PUBLICATIONS

Sep. 30, 2019—U.S. Non-final Office Action—U.S. Appl. No. 15/595,885.
(Continued)

*Primary Examiner* — Tamara T Kyle
*Assistant Examiner* — Lahcen Ennaji

(57) ABSTRACT

Methods and systems for coordinating migration for a database of a service are described herein. Multiple releases of the service may be simultaneously implemented, and these multiple releases may access a shared database. As new releases of the service are activated, the database may be incrementally migrated to a new data schema version. The new data schema version may be compatible with each release of the service that is in use. After a migration has begun, instances of the service may be instructed to perform database operations using methods compatible with the new data schema version. Continuation tokens may be returned during the migration, which indicate portions of the shared database that have not yet been migrated. If an error occurs during the migration, the continuation tokens may be discarded, and the migration may be restarted.

22 Claims, 13 Drawing Sheets

(51) Int. Cl.
*G06F 16/23* (2019.01)
*G06F 11/30* (2006.01)

(52) U.S. Cl.
CPC ........ *G06F 11/3055* (2013.01); *G06F 16/214* (2019.01); *G06F 16/2329* (2019.01); *G06F 2201/80* (2013.01); *G06F 2201/84* (2013.01)

(58) Field of Classification Search
CPC ............. G06F 11/3055; G06F 2201/80; G06F 2201/84
See application file for complete search history.

(56) References Cited

U.S. PATENT DOCUMENTS

| | | | |
|---|---|---|---|
| 2006/0184838 A1* | 8/2006 | Singonahalli | G06F 11/3688 714/45 |
| 2006/0190497 A1* | 8/2006 | Inturi | G06F 16/213 |
| 2006/0195436 A1 | 8/2006 | Levesque et al. | |
| 2006/0265696 A1* | 11/2006 | Mayfield | G06F 11/1433 717/137 |
| 2012/0036166 A1* | 2/2012 | Qiu | G06F 16/213 707/E17.005 |
| 2014/0095432 A1 | 4/2014 | Trumbull et al. | |
| 2014/0282469 A1* | 9/2014 | Johnson | G06F 8/65 717/170 |
| 2015/0149605 A1* | 5/2015 | de la Iglesia | G06F 3/067 709/223 |
| 2016/0179850 A1* | 6/2016 | Martin | G06F 16/278 707/634 |
| 2016/0246833 A1* | 8/2016 | Eberlein | G06F 16/213 |
| 2018/0191839 A1* | 7/2018 | Condict | H04L 67/1097 |
| 2018/0191939 A1 | 7/2018 | Yan et al. | |
| 2018/0217819 A1* | 8/2018 | Leen | G06F 8/41 |
| 2018/0329931 A1* | 11/2018 | Baid | G06F 16/213 |

OTHER PUBLICATIONS

Jun. 30, 2020—U.S. Notice of Allowance—U.S. Appl. No. 15/595,885.

* cited by examiner

DATA MIGRATION FOR A SHARED DATABASE

This application is a continuation of and claims priority to co-pending U.S. application Ser. No. 15/595,885 filed May 15, 2017, and entitled "Data Migration For A Shared Database," which is incorporated herein by reference in its entirety.

FIELD

Aspects described herein generally relate to computers, networking, hardware, and software. More specifically, one or more aspects of the disclosure relate to managing stored data used by services, and in particular, relate to performing updates to the stored data.

BACKGROUND

Multiple versions, e.g., releases, of a software service, and multiple instances of each version of the software service, may be operated simultaneously. For example, when initially releasing a new version of a service, 90% of users may be directed to the old version, and 10% may be directed to the new version. The users of the old version of the software service may then be incrementally migrated to the new version of the software service. The multiple versions of the software service may share data, such as by accessing a shared database. The multiple versions of the software service may each support different versions of the data. By migrating the users of the software service incrementally, developers can test the new version of the software service with a smaller number of users, and, if needed, migrate those users back to the old version of the software service when there are problems.

Because multiple versions of the software service may be accessing the shared data, the data should be kept in a format that is compatible with each version of the software service that is in use. Coordinating data migration while multiple versions of the service are operational can be complex. Potential difficulties in managing data migration can include: maintaining the state of migration over multiple instances, coordinating migration execution between different source versions, maintaining multiple sets of data access layer code, managing data operations that are performed during the migration process, and error handling during the migration process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for managing data migration for data shared between multiple versions of a service.

In particular, one or more aspects of the disclosure provide ways of managing a migration between two or more implemented versions of a service. For example, by implementing one or more aspects of the disclosure, shared data used by the service may be upgraded to a highest version compatible with each of the implemented versions of the service. Additionally, data operations performed during the migration may be performed using the highest version compatible with each of the implemented versions of the service.

In some embodiments, first data schema information corresponding to a first release version of a service may be received from the first release version. Second data schema information corresponding to a second release version of the service may be received from the second release version. The first data schema information and the second data schema information may be compared to determine a highest common data schema version of the first release version and the second release version. An indication that the service is currently migrating to the highest common data schema version may be stored, and a database of the service may be migrated to the highest common data schema version.

The migrating may be performed in response to a determination that the highest common data schema version is higher than a currently implemented data schema version of the service. The first release version of the service and the second release version of the service may be instructed to perform data operations on the database at the highest common data schema version. The first data schema information may comprise a highest data schema version that the first release version is configured to read and write. A first portion of users of the service may be directed to the first release version of the service and a second portion of users of the service may be directed to the second release version of the service. An address may be determined for the first release version, and the address may be queried for the first data schema information.

The database may be migrated to the highest common data schema version by causing one or more rows of the database to be migrated to the highest common data schema version, receiving an indication that an error has occurred during the migration, and restarting the migration. The database may be migrated to the highest common data schema version by causing a first portion of the database to be migrated to the highest common data schema version, receiving a continuation token or tokens indicating the first portion, and causing a second portion of the database to be migrated to the highest common data schema version. The database may be migrated to the highest common data schema version by determining whether each row of the database is below the highest common data schema version, and converting each row of the database that is below the highest common data schema version to the highest common data schema version.

In some embodiments, first data schema information corresponding to a first release version of a service may be received from the first release version. Second data schema information corresponding to a second release version of the service may be received from the second release version. The first data schema information and the second data schema information may be compared to determine a highest common data schema version of the first release version and the second release version. In response to determining that the highest common data schema version is higher than a current data schema version of the service, a migration may be initiated. The migration may migrate the service to the highest common data schema version. The first release version and second release version of the service may be instructed to use data access layer methods compatible with the highest common data schema version.

A stored indicator of the current data schema version of the service may be modified to indicate the highest common data schema version. Records in a database for the service may be updated to the highest common data schema version. The database may be a shared database accessed by instances of the first release version and instances of the second release version.

The highest common data schema version may be determined by determining that instances of the first release version and instances of the second release version can perform read and write operations at the highest common data schema version. The highest common data schema version may be determined by determining that the first release version and the second release version have code for performing read and write operations at the highest common data schema version.

In some embodiments, first data schema information for a first release version of a service may be compared to second data schema information for a second release version of the service to determine a highest common data schema version of the first release version and the second release version. In response to determining that the highest common data schema version is higher than a current data schema version of the service, a first portion of a migration to the highest common data schema version may be initiated. One or more continuation tokens for the migration may be received. A second portion of the migration may be initiated, and an indication that an error occurred during the second portion may be received. The one or more continuation tokens may be deleted, and the migration may be restarted.

The second portion of the migration may be initiated using the continuation tokens. The continuation tokens may be stored in a dictionary, and the continuation tokens may be deleted by deleting the dictionary. The first portion of the migration may be initiated by transmitting an instruction to migrate a predetermined number of rows of a database for the service. The first portion of the migration may be initiated by transmitting a data schema version corresponding to the highest common data schema version.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards managing data migration for services with multiple deployed production releases. A migration system may poll the multiple deployed production releases of the service to determine a highest common data schema version supported by the deployed releases. If the highest common data schema version is higher than the current data schema version of the shared data, then the migration system may initiate a data migration to upgrade the shared data to the highest common data schema version. The data migration may be performed incrementally, over a predetermined schedule.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
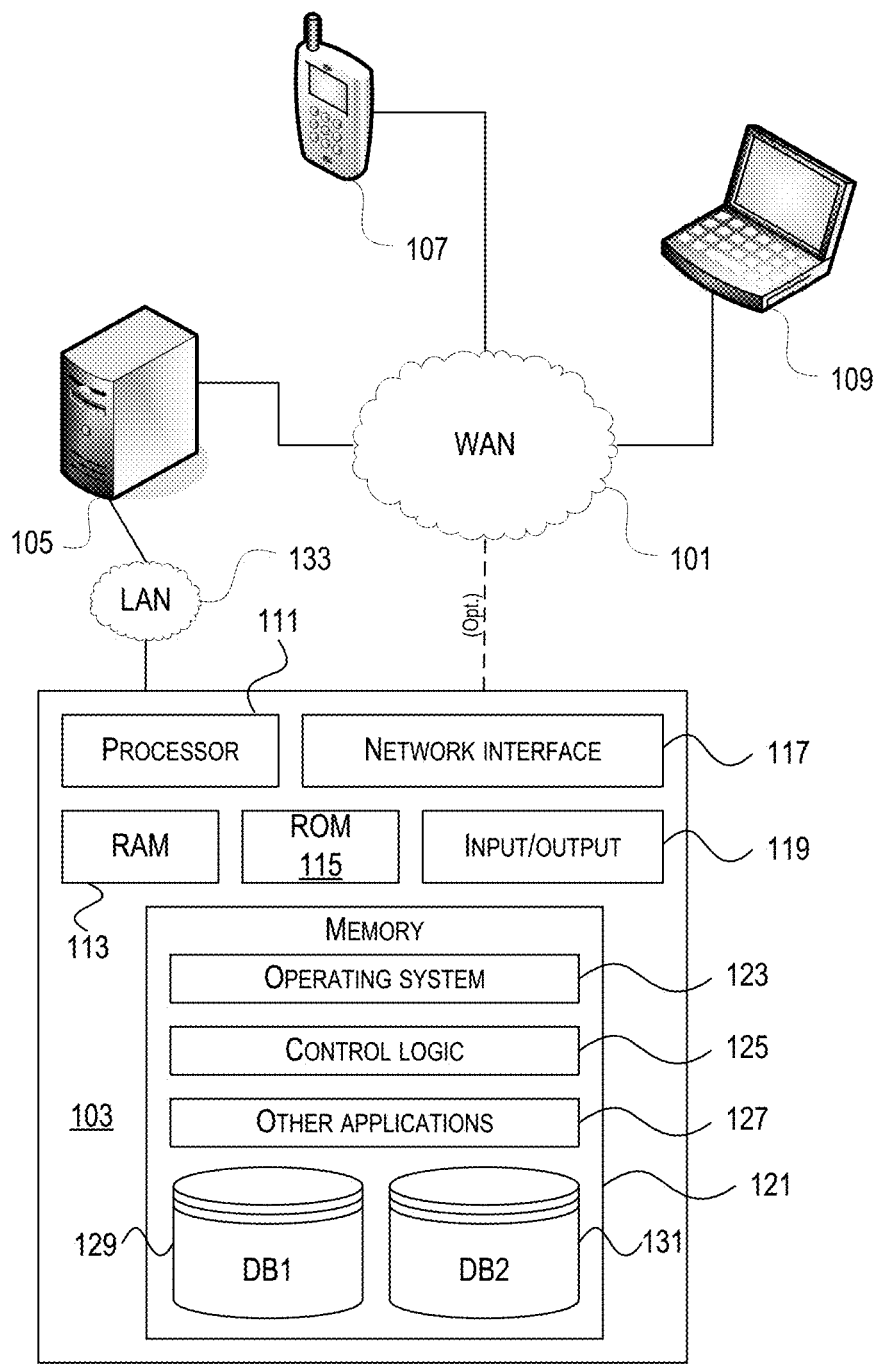
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
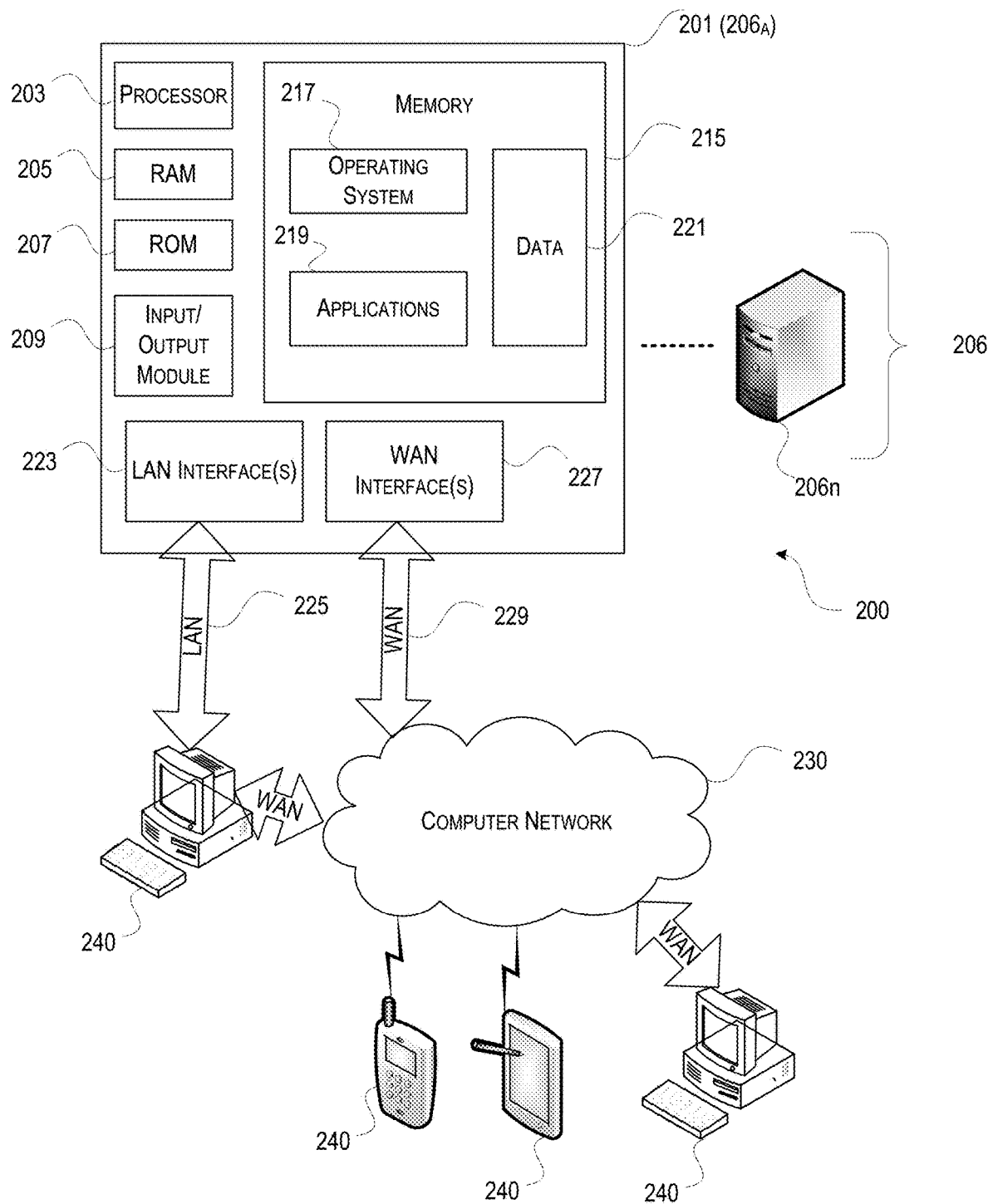
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
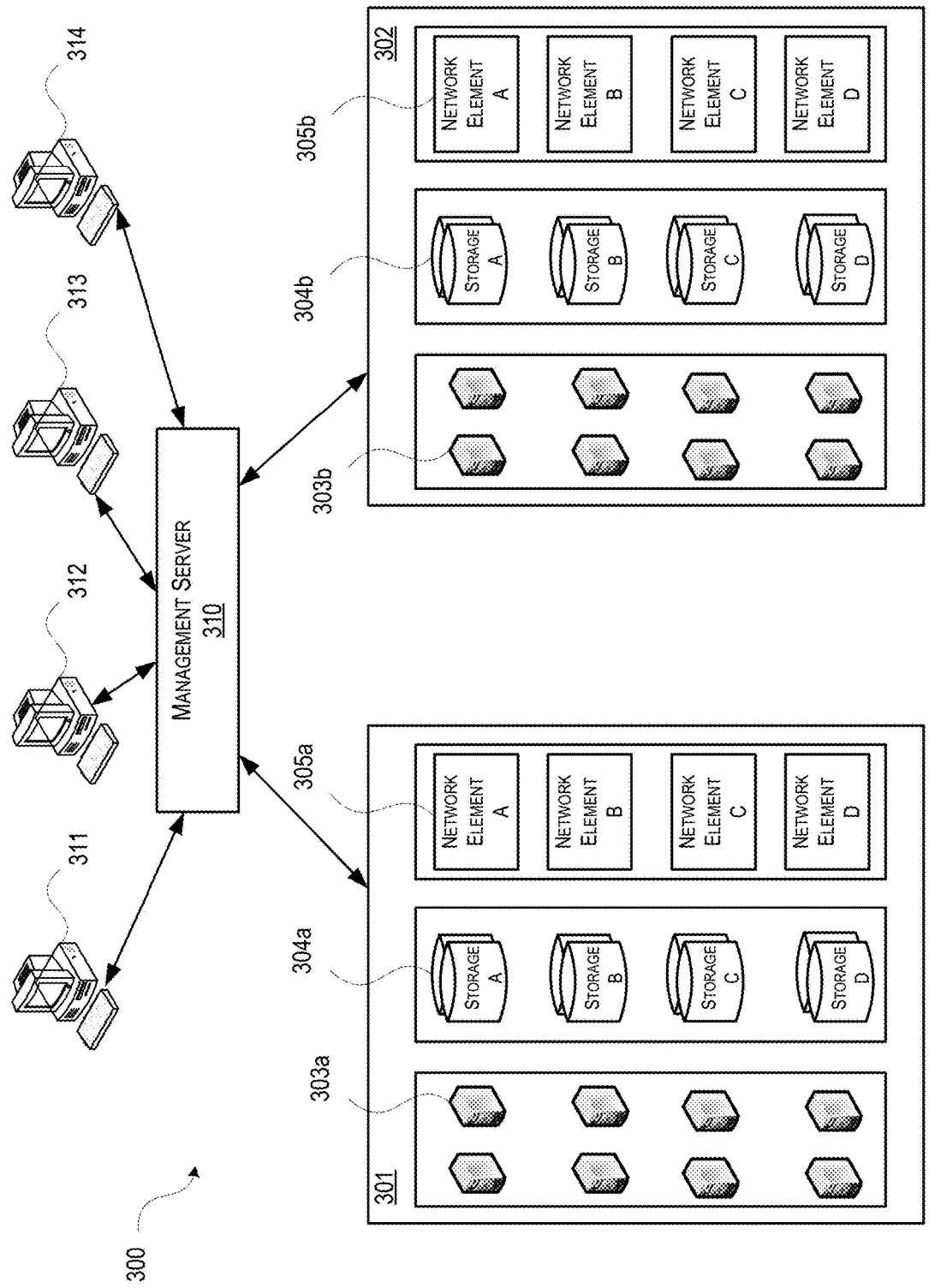
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network resources 305a-305b (generally referred herein as "network resources 305")) of the cloud system.

Management server 310 may be implemented on one or more physical servers. The management server 310 may run, for example, CLOUDPLATFORM by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. Each zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, each zone 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical hosting resources in a cloud zone 301-302 may include one or more computer servers 303, such as virtualization servers, which may be configured to create and host virtual machine instances. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer (e.g., as shown in FIGS. 1-2) with additional hardware and/or software resources configured to create and manage virtual machines and provide other services to customers using the physical resources in the cloud. The virtualization layer may include components to provide network virtualizations, storage virtualizations, etc. The virtualization layer may be a separate layer from the physical resource layer, or may share some or all of the same hardware and/or software resources with the physical resource layer. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Data Migration

Figure 4:
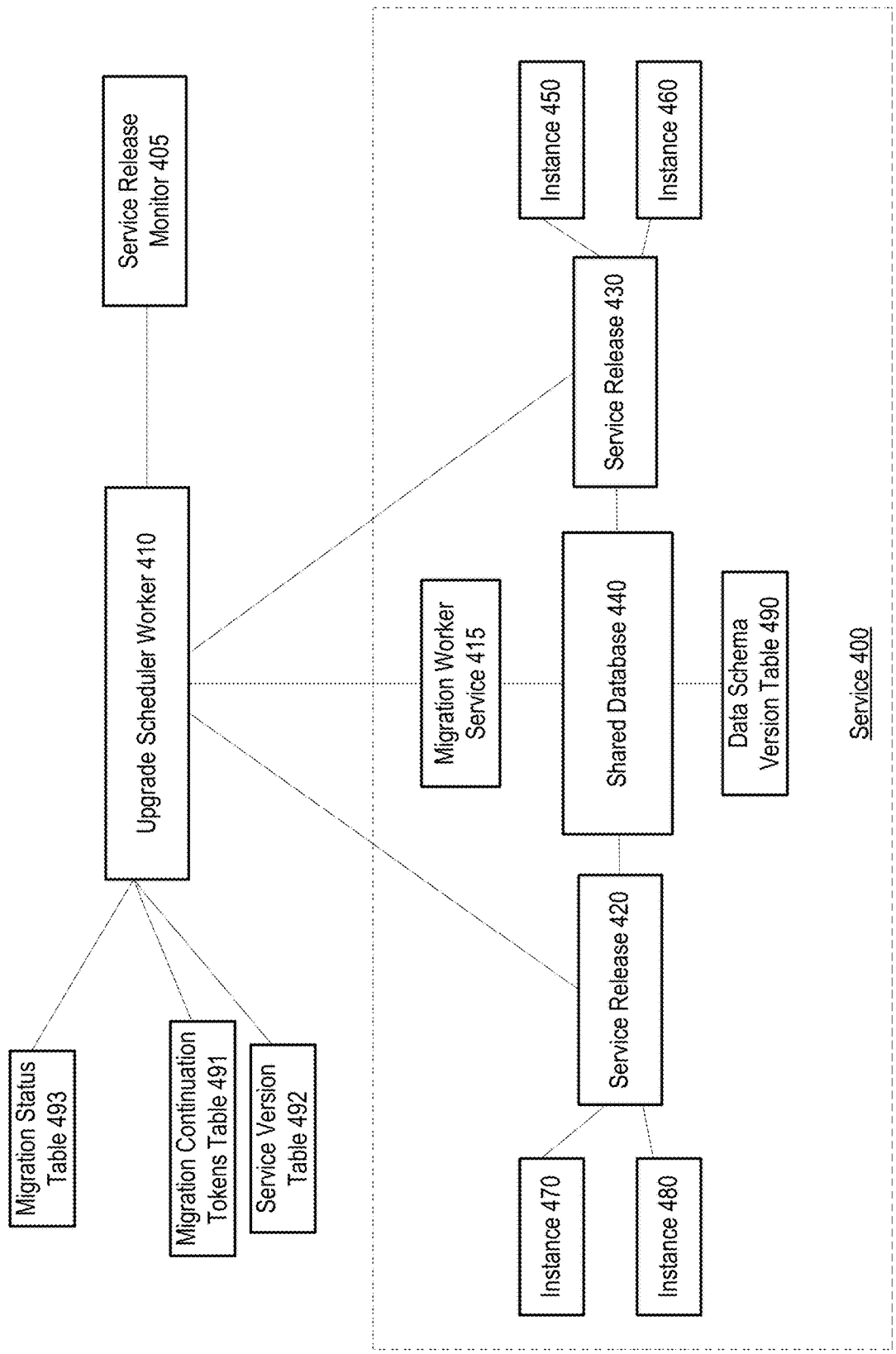
FIG. 4 is a diagram of a data migration system according to one or more illustrative aspects of the disclosure.

FIG. 4 illustrates a diagram of a data migration system according to one or more illustrative aspects of the disclosure. Service release 420 and service release 430 may be different release versions of a software service 400. For example, service release 420 may comprise an initial version of the software service 400, and service release 430 may comprise an updated version of the software service 400. The software service 400 may comprise any type of service, such as a virtual desktop service, a file management service, an application virtualization service, an e-mail client, or any other service. The service 400 may comprise a stateless service.

When a user accesses the service 400, the user may be directed to an instance 470 or 480 of service release 420, or an instance 450 or 460 of service release 430. A canary release process, blue-green deployment, or any other release process may be used to manage deployment of the service 400. For example, service release 420 may comprise a stable version of the software service 400, and service release 430 may comprise a test release of the software service 400. In this example, a portion of the users that access the service 400, such as 10% of the users, may be directed to the test service release 430, and the remaining 90% of users may be directed to the stable service release 420. By directing a portion of users to the test service release 430, the developer of the service 400 may be able to determine whether the test service release 430 should be labeled a stable release. Additionally, developers may be able to determine if there are bugs or other issues with the test service release 430.

Over the duration of the release cycle, users may be incrementally migrated from the stable release 420 to the latest release 430. After the service release 430 has been marked stable, all users of the service 400 may be directed to the service release 430. Then, the service release 420 may be overwritten with a new deployment, e.g., a new test service release, and users may slowly be diverted from the stable service release 430 to the new test service release. Although FIG. 4 illustrates two service releases for one service, any number of service releases, or services, may be supported using the techniques described herein. For example, the upgrade scheduler worker 410 may manage twenty services, each having four deployed service releases. In another example, the upgrade scheduler worker 410 may manage migration for one service having three versions, a stable version, a new version, and a recovery version.

Both the service release 420 and the service release 430, or, more specifically, instances of the service releases 420 and 430, such as instances 450-480, may access a shared database 440. The shared database 440 may comprise information used by the software service 400 implemented in service releases 420 and 430. For example, user-specific data for a user of the software service 400 may be stored in the shared database 440. Regardless of whether a user is directed to an instance of the service release 420 or the service release 430, the same data, stored in the shared database 440, may be accessed. Thus, data stored in the shared database 440 may be compatible with both service release 420 and service release 430. In other words, each of instances 450-480 may be able to perform data operations on the shared database 440, such as create, read, update, and/or delete (CRUD) operations on the shared database 440. Each table of the shared database 440 may comprise a data schema version column, which indicates a data schema version for each row of data. After each data operation, such as an update or insert, the data schema version column may be updated to indicate the current data schema version of that column A data schema version table 490 in shared database 440 may comprise a current data schema version to be used when service 400 is performing CRUD operations on the database, and this current data schema version may be stored in the data schema version column when a CRUD operation is performed.

An upgrade scheduler worker 410 may be configured to coordinate the data migration process for one or more services with a plurality of production releases, such as the service 400. The upgrade scheduler worker 410 may poll a service release monitor 405, such as a canary service, to determine how many releases of the service 400 are in use, and to receive routing data, such as an address, for each of service release 420 and service release 430. The routing data may comprise a Uniform Resource Locator (URL) of the service release 420 and a URL of the service release 430. The address information may be stored by the upgrade scheduler worker 410. The address information may comprise a single address, which may be modified to access either the service release 420 or the service release 430.

The upgrade scheduler worker 410 may receive version information corresponding to the service releases 420 and 430, which may comprise data schema version information corresponding to the service releases 420 and 430. The version information corresponding to a service release may indicate a release number (e.g., version) of the service release, which schema versions the service release is capable of reading, which schema versions the service release is capable of writing, and/or which schema versions the service release can migrate. For example, the version information for service release 420 may indicate that the service release 420 comprises code capable of reading data compatible with schema versions 1.0 and 1.1, writing data compatible with schema versions 1.0 or 1.1, and migrating data from schema version 1.0 to version 1.1. In another example, the version information for service release 420 may indicate that the service release 420 is at version 1.0, and the version information for service release 430 may indicate that the service release 430 is at version 1.2. The version information for the service releases 420 and 430 may be stored in a service version table 492. Each release of the service 400, such as service releases 420 and 430, may comprise one or more versions of migration code, for migrating data in the shared database 440.

The upgrade scheduler worker 410 may query the service release monitor 405 for a release number of service release 420 and/or service release 430. The upgrade scheduler worker 410 may query the service release monitor 405 for an address of service release 420 and/or service release 430. For example, the upgrade scheduler worker may access a registry of the service release monitor 405 to determine addresses for service release 420 and service release 430. The upgrade scheduler worker 410 may receive addresses of the service releases 420 and 430 from the service release monitor 405, and then the upgrade scheduler worker may poll the service releases 420 and 430, using the received addresses, for their respective data schema information.

The upgrade scheduler worker 410 may determine a highest common schema version for the service releases 420 and 430. For example, if the service release 420 supports schema versions 1.0-1.4, and the service release 430 supports schema versions 0.9-1.2, then 1.2 would be the highest common schema version. If data in the shared database 440 is stored at a lower version than the highest common schema version, then the upgrade scheduler worker 410 may initiate a data migration to upgrade the data in the shared database 440 to the highest common scheme version.

In one embodiment, the upgrade scheduler worker 410 may determine a lowest common schema version supported by the service releases 420 and 430. For example, if the service release 420 supports schema versions 1.0-1.4, and the service release 430 supports schema versions 0.9-1.2, then 1.0 would be the lowest common schema version. If data in the shared database is stored at a lower version than the lowest common schema version, any data stored at the lower version may be migrated to the lowest common schema version or any schema version above the lowest common schema version. In the previous example, if the shared database 440 comprises a first plurality of rows corresponding to schema version 0.9 and a second plurality of rows corresponding to schema version 1.1, then the first plurality of rows will be migrated to schema version 1.0 or higher, and the second plurality of rows will not be migrated.

To perform a data migration, the upgrade scheduler worker 410 may instruct the migration worker service 415 to perform the migration. The migration worker service 415 may be integrated in the service release 420 or the service release 430, or operations described as being performed by the migration worker service 415 may be performed by the service release 420 or the service release 430. For example, the migration worker service 415 may comprise an endpoint in the service release 420 and/or the service release 430. Each of the service releases 420 and 430 may comprise code for performing the actions described in regards to migration worker service 415. Operations of the migration worker service 415 are further described below in regards to FIG. 12. The migration worker service 415 may be instructed, by the upgrade scheduler worker 410, to perform one or more units of migration. The upgrade scheduler worker 410 may instruct the migration worker service 415 to perform one unit of migration at a set interval. For example, every hour the upgrade scheduler worker 410 may wake and instruct the migration worker service 415 to perform one unit of migration. To perform the unit of migration, the migration worker service 415 may use migration code in the service release 420 or the service release 430 to migrate data in the shared database 440.

When the migration worker service 415 has completed the unit of migration, one or more continuation tokens may be transmitted to the upgrade scheduler worker 410. The continuation tokens may indicate one or more locations in the shared database 440 at which the migration was stopped. For example, the continuation tokens may indicate the last processed row in multiple tables related to the service 400 in the shared database 440. In this example, any row above the row indicated in the continuation token may comprise data that has been migrated to the new data schema version, and rows below the row indicated in the continuation token may comprise data that has not yet been migrated to the new data schema version. A status of the migration may be stored in a migration status table 493. A continuation token may be generated for each data access layer of the service 400.

The continuation tokens may be stored in a migration continuation tokens table 491. The continuation tokens may be stored in a dictionary, with the key indicating the data access layer name or the data type, and the token in the value. The continuation token may comprise a partition key and/or a row key. The stored tokens may comprise a reference to a specific migration that they correspond to in the migration status table 493.

After receiving the continuation tokens, the upgrade scheduler worker 410 may instruct the migration worker service 415 to perform another unit of migration. The instruction to the migration worker service 415 may comprise all or a portion of the continuation tokens that were previously returned by the migration worker service 415. The migration worker service 415 may use the received continuation tokens to determine where to begin the next unit of migration. Operations of the upgrade scheduler worker 410 will be further described below, in regards to FIGS. 5-11.

Figure 5:
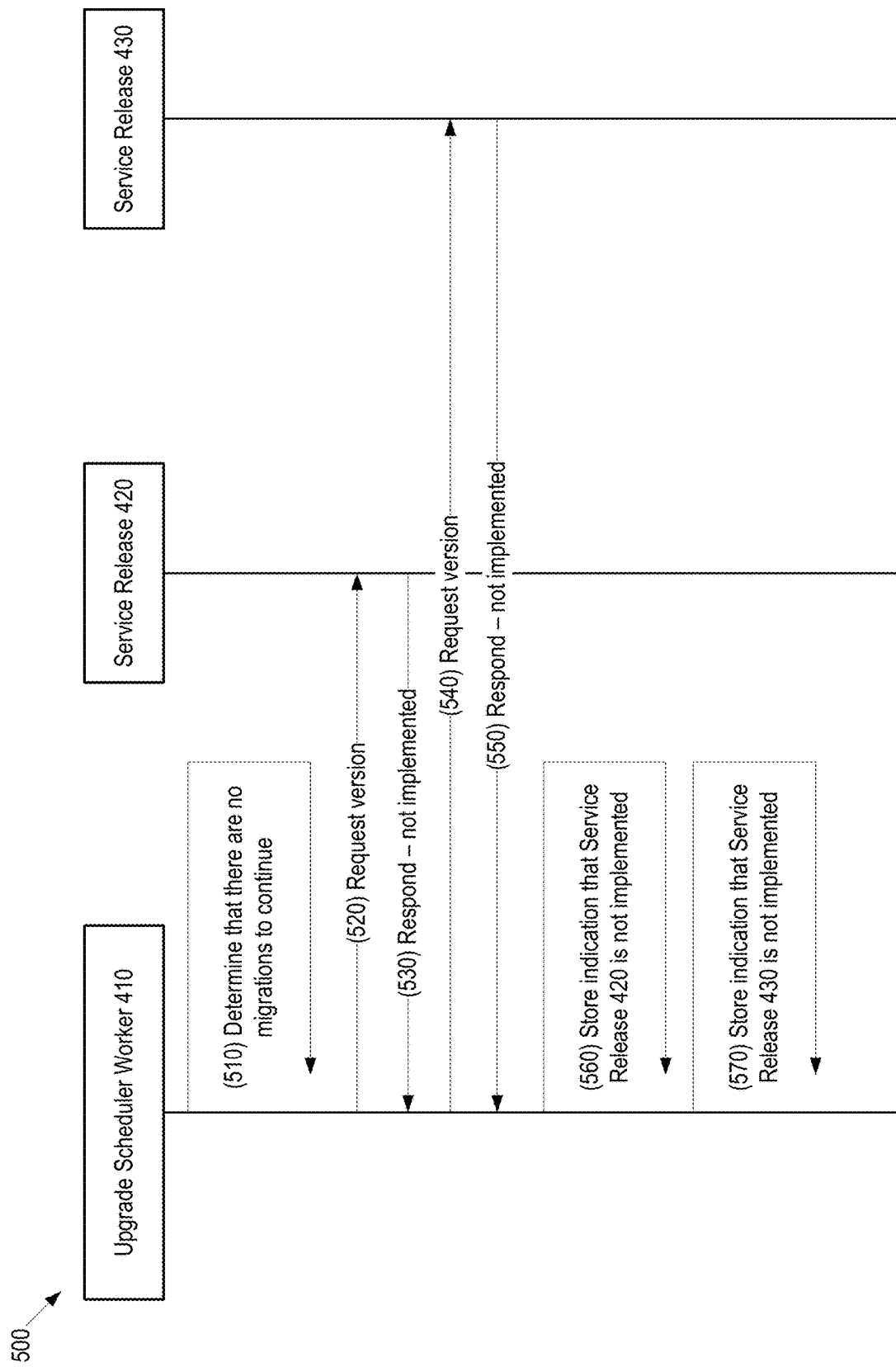
FIG. 5 is a diagram illustrating data migration operations without an implemented service release according to one or more illustrative aspects of the disclosure.

FIG. 5 is a diagram 500 illustrating data migration operations without an implemented service release according to one or more illustrative aspects of the disclosure. In one or more embodiments, one or more steps illustrated in the diagram 500 may be performed by one or more computing devices or entities. For example, portions of the steps illustrated in the diagram 500 may be performed by one or more computing devices 201 or by the cloud computing environment 300. The steps illustrated in the diagram 500 may be embodied in computer-executable instructions that are stored in a computer-readable medium, such as a non-transitory computer readable medium. The steps illustrated in the diagram 500 need not all be performed in the order specified, and some steps may be omitted or changed in order.

At step 510, the upgrade scheduler worker 410 may determine that there are no migrations to continue. The upgrade scheduler worker 410 may access the migration status table 493 to determine whether there is a migration to continue. The migration status table 493 may store a status for each of one or more services managed by the upgrade scheduler worker 410, such as service 400. The service version table 492 may store a current data version for each of the one or more services. The current data version of the service 400 may indicate a currently implemented data schema for the shared database 440. At step 510, the upgrade scheduler worker 410 may check the migration status table 493 for the status of the service 400, and determine that there is not an ongoing migration for the service 400.

At step 520, the upgrade scheduler worker 410 may request the current version of the service release 420. The upgrade scheduler worker 410 may request a highest supported data schema version of the service release 420. As described above in regards to FIG. 4, the upgrade scheduler worker 410 may request or retrieve an address corresponding to the service release 420, and then poll the service release 420 for version information. The upgrade scheduler worker 410 may request the address from the service release monitor 405. Alternatively, the upgrade scheduler worker 410 may retrieve stored location information, such as an address stored in a table. The upgrade scheduler worker 410 may poll a GET endpoint corresponding to the service release 420 to receive data schema version information for the service release 420. In addition to an address of the service release 420, the service release monitor 405 may provide a version number of the service release 420, or other information related to the service release 420.

In response to the request received at step 520, at step 530, the service release 420, or the service release monitor 405, may indicate to the upgrade scheduler worker 410 that the service release 420 has not yet implemented the data migration system described herein. For example, if the service release 420 has not been activated, or if no instances of the service release 420 are instantiated, or if services of release 420 are instantiated but do not yet implement the data schema version endpoint, then the service release 420 may indicate that it has not yet been implemented.

At step 540, the upgrade scheduler worker 410 may request version information for the service release 430. The upgrade scheduler worker 410 may request a highest supported schema version of the service release 430. At step 550, the service release 430 may respond that it has not yet been implemented. Similar actions to those described above in regards to steps 520 and 530 may be performed at steps 540 and 550.

At step 560, the upgrade scheduler worker 410 may store a record of the version information corresponding to the service release 420. The upgrade scheduler worker 410 may store an indication that service release 420 is not implemented. The indication may be stored in the service version table 492. At step 570, the upgrade scheduler worker 410 may store a record of the version information corresponding to service release 430, for example, in the service version table 492.

Figure 6:
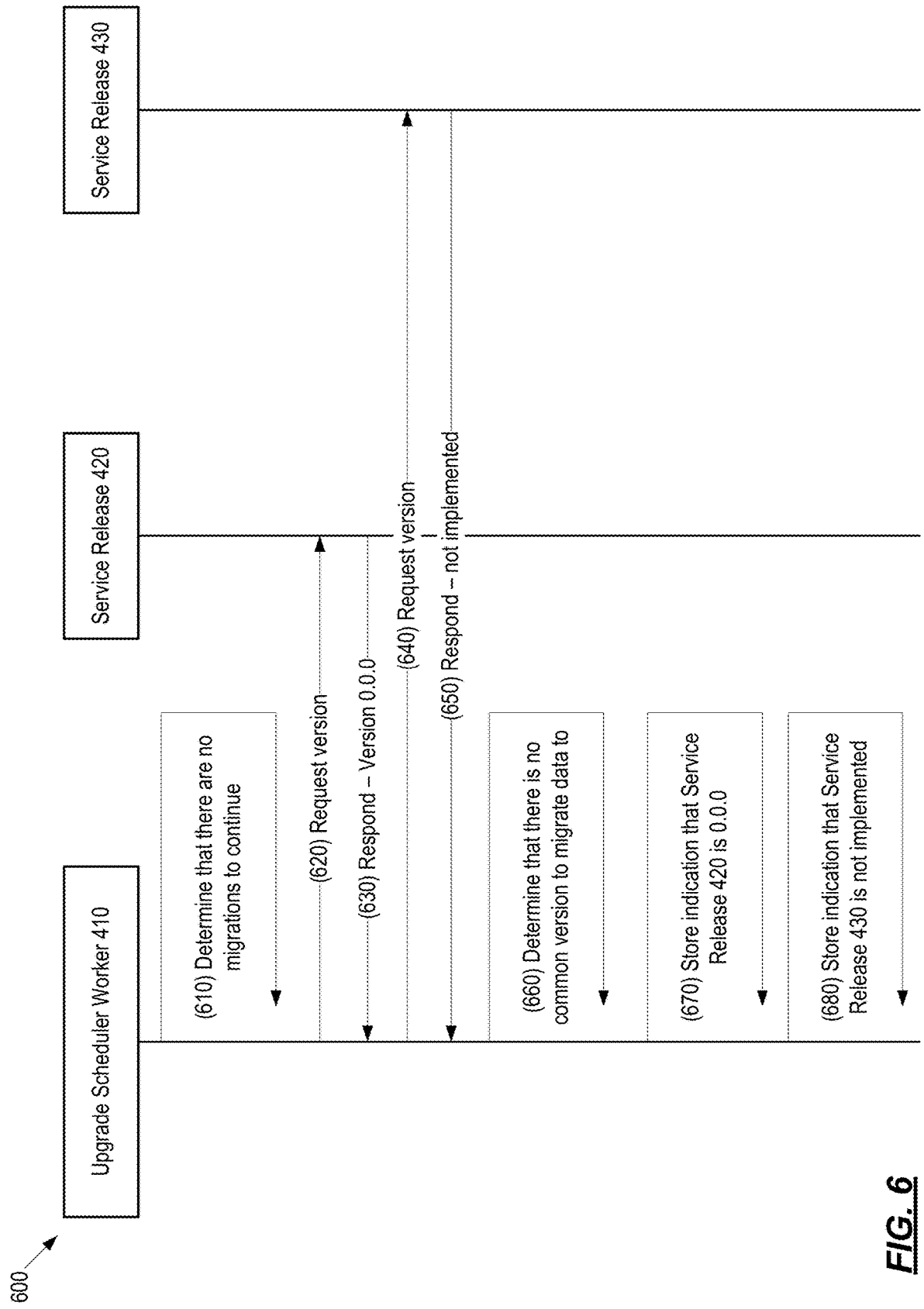
FIG. 6 is a diagram illustrating data migration operations with one implemented service release according to one or more illustrative aspects of the disclosure.

FIG. 6 is a diagram 600 illustrating data migration operations with one implemented service release according to one or more illustrative aspects of the disclosure. In one or more embodiments, one or more steps illustrated in the diagram 600 may be performed by one or more computing devices or entities. For example, portions of the steps illustrated in the diagram 600 may be performed by one or more computing devices 201 or by the cloud computing environment 300. The steps illustrated in the diagram 600 may be embodied in computer-executable instructions that are stored in a computer-readable medium, such as a non-transitory computer readable medium. The steps illustrated in the diagram 600 need not all be performed in the order specified, and some steps may be omitted or changed in order.

At step 610, the upgrade scheduler worker 410 may determine that there are no migrations to continue. Actions performed at step 610 may be similar to those described above at step 510 of FIG. 5. At step 620, the upgrade scheduler worker 410 may request the current version of the service release 420. Actions performed at step 620 may be similar to those described above at step 520 of FIG. 5.

At step 630, the service release 420 may respond to the request received at step 620. The service release 420 may respond with an indication that the service release 420 does implement the data schema version endpoint, and that the current version is 0.0.0. The response may comprise a version of the service release 420, an indication of whether the service release 420 is a production release, information regarding instances of the service release 420, schema data for the service release 420, an indication as to whether the service release 420 is indicated as stable, and/or other data regarding the service release 420. The response at step 630 may comprise one or more schema versions that the service release 420 can read, one or more schema versions that the service release 420 can write, and one or more schema versions that the service release 420 can migrate. For example, the response transmitted at step 630 may comprise an indication that the service release 420 comprises three sets of code for writing data, where each set of code is compatible with a different schema version.

At step 640, the upgrade scheduler worker 410 may request the current version of the service release 420. At step 650, the service release 430 may respond that it has not yet been implemented. Similar actions to those described above in regards to steps 540 and 550 of FIG. 5 may be performed at steps 640 and 650.

At step 660, the upgrade scheduler worker 410 may determine that there is no common schema version to migrate shared data to, such as data in the shared database 440. In the example illustrated in the diagram 600, service release 430 is not yet implemented, therefore there is no common supported data version between the service release 420 and the service release 430.

At step 670, the upgrade scheduler worker 410 may store a record of the version information corresponding to service release 420. The stored record may indicate that service release 420 is at version 0.0.0. The stored record may comprise a version of the service release 420, data schema information corresponding to the service release 420, and/or other data regarding service release 420. The record may be stored in the service version table 492. At step 680, the upgrade scheduler worker 410 may store a record of the version information corresponding to service release 430. The upgrade scheduler worker 410 may store an indication that service release 430 is not implemented.

Figure 7:
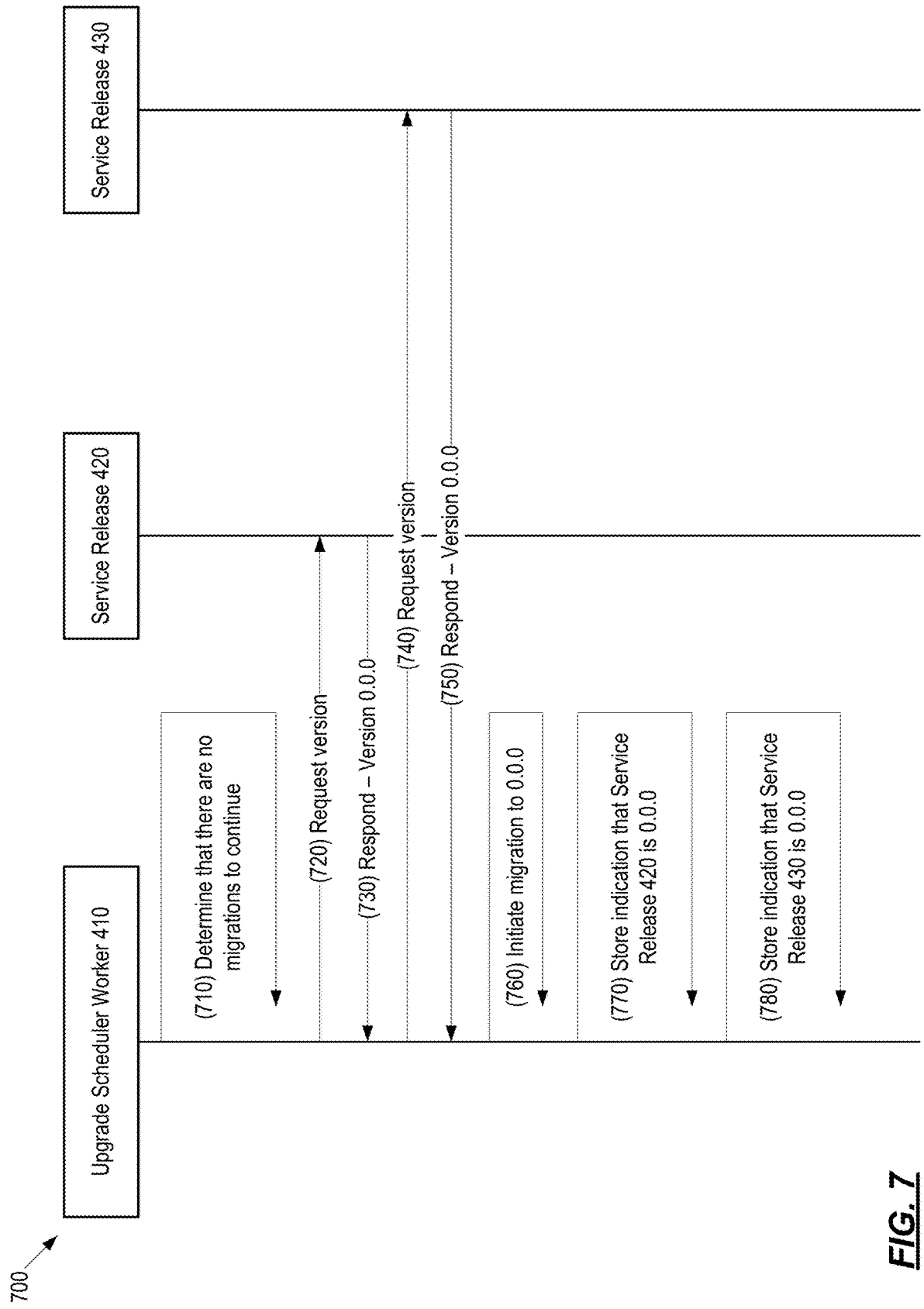
FIG. 7 is a diagram illustrating initiating a data migration according to one or more illustrative aspects of the disclosure.

FIG. 7 is a diagram 700 illustrating initiating a data migration according to one or more illustrative aspects of the disclosure. In one or more embodiments, one or more steps illustrated in the diagram 700 may be performed by one or more computing devices or entities. For example, portions of the steps illustrated in the diagram 700 may be performed by one or more computing devices 201 or by the cloud computing environment 300. The steps illustrated in the diagram 700 may be embodied in computer-executable instructions that are stored in a computer-readable medium, such as a non-transitory computer readable medium. The steps illustrated in the diagram 700 need not all be performed in the order specified, and some steps may be omitted or changed in order.

At step 710, the upgrade scheduler worker 410 may determine that there are no migrations to continue. Actions performed at step 710 may be similar to those described above at step 510 of FIG. 5. At step 720, the upgrade scheduler worker 410 may request the current version of the service release 420. At step 730, the service release 420 may respond to the request received at step 720. The service release 420 may respond with an indication that the service release 420 is implemented, and at version 0.0.0. Actions performed at step 730 may be similar to those described above at step 630 of FIG. 6.

At step 740, the upgrade scheduler worker 410 may request the current version of the service release 430. Actions performed at step 740 may be similar to those described above at step 540 of FIG. 5. At step 750, the service release 430 may respond to the request received at step 740 with an indication that the service release 430 is implemented at version 0.0.0. Actions performed at step 750 may be similar to those described above at step 630 of FIG. 6.

Figure 11:
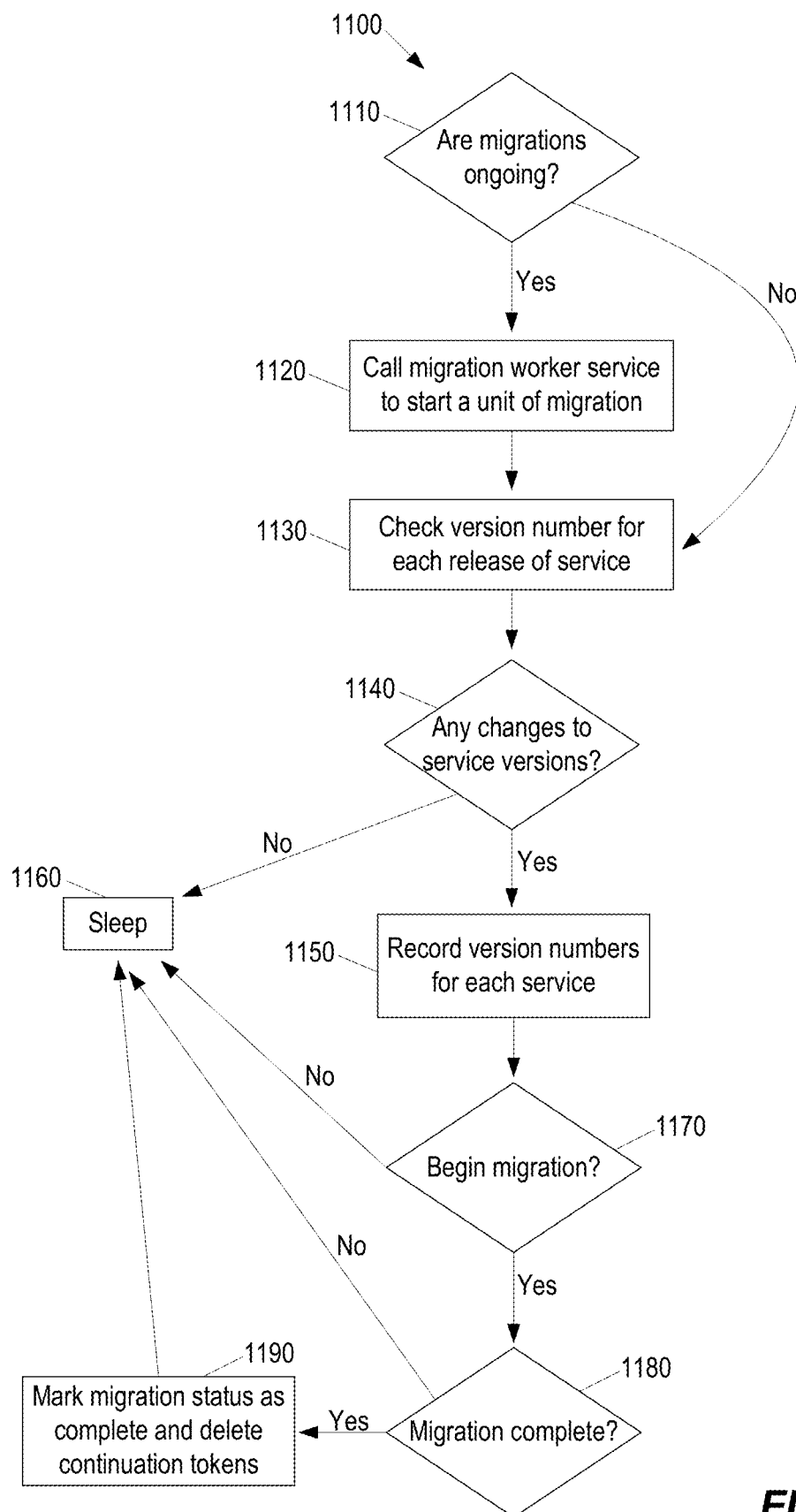
FIG. 11 is a flow diagram of a method for managing data migration according to one or more illustrative aspects of the disclosure.

At step 760, the upgrade scheduler worker 410 may determine that both service releases 420 and 430 are implemented, and that there is a highest common version of 0.0.0. The upgrade scheduler worker 410 may compare the versions of service releases 420 and 430 to stored version information in the service version table 492. The upgrade scheduler worker 410 may determine that the highest common version has changed from none, when one of the service releases 420 and 430 was not implemented, to 0.0.0, now that both service releases 420 and 430 are implemented. After determining that the highest common version has changed from none to 0.0.0, the upgrade scheduler worker 410 may initiate a migration of the service 400 to version 0.0.0. The upgrade scheduler worker 410 may transmit an instruction to the migration worker service 415 to begin the migration. The instruction to the migration worker service 415 may comprise the data schema for the highest common version, which may be retrieved from the service version table 492. FIG. 11, described below, further describes actions that may be performed at step 760.

At steps 770 and 780, the upgrade scheduler worker 410 may store one or more records of the version information corresponding to service releases 420 and 430. The stored records may indicate that service releases 420 and 430 are at version 0.0.0. The records may be stored in the service version table 492. Additionally, an indication that a migration is ongoing for service 400 may be stored, for example, in the migration status table 493. Actions performed at steps 770 and 780 may be similar to those described above at steps 670 and 680 of FIG. 6.

Figure 8:
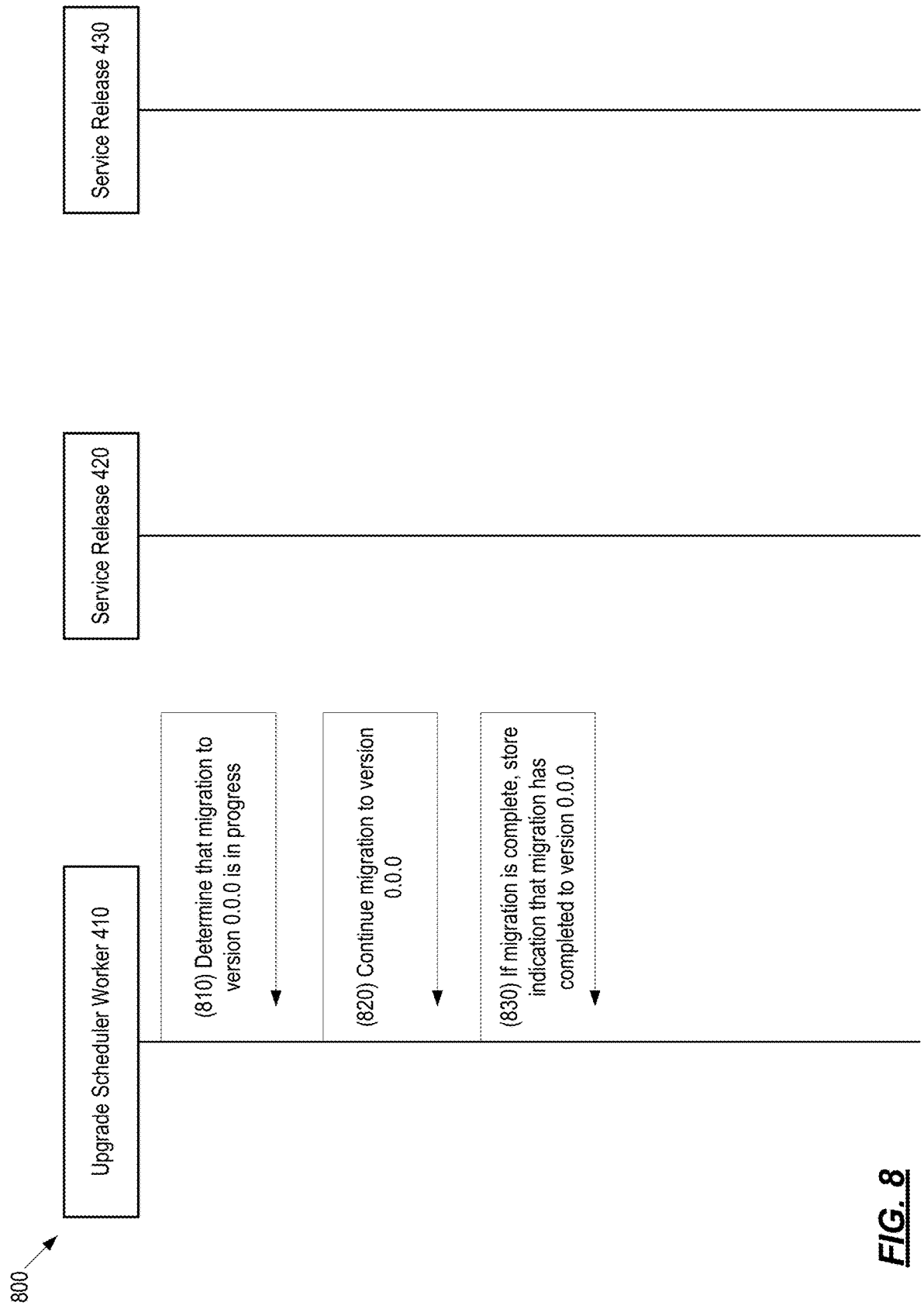
FIG. 8 is a diagram illustrating continuing an ongoing data migration according to one or more illustrative aspects of the disclosure.

FIG. 8 is a diagram 800 illustrating continuing an ongoing data migration according to one or more illustrative aspects of the disclosure. In one or more embodiments, one or more steps illustrated in the diagram 800 may be performed by one or more computing devices or entities. For example, portions of the steps illustrated in the diagram 800 may be performed by one or more computing devices 201 or by the cloud computing environment 300. The steps illustrated in the diagram 800 may be embodied in computer-executable instructions that are stored in a computer-readable medium, such as a non-transitory computer readable medium. The steps illustrated in the diagram 800 need not all be performed in the order specified, and some steps may be omitted or changed in order.

At step 810, the upgrade scheduler worker 410 may determine that there is a data migration currently in progress to version 0.0.0 for the service 400. The upgrade scheduler worker 410 may access the migration status table 493 to determine whether a migration is in progress and/or a version migrated to for the shared database 440. At step 810, the migration status table may indicate that a data migration is in progress to version 0.0.0.

At step 820, the upgrade scheduler worker 410 may continue the ongoing migration to version 0.0.0. The upgrade scheduler worker 410 may retrieve continuation tokens associated with the migration to version 0.0.0, or other data associated with the migration to version 0.0.0. The continuation tokens may be retrieved from the migration continuation tokens table 491. The continuation tokens may indicate portions of the shared database 440 that have been migrated 0.0.0, and portions of the shared database 440 that have not yet been migrated to 0.0.0. The upgrade scheduler worker 410 may transmit the continuation tokens to the migration worker service 415, which may perform the data migration.

After receiving the continuation tokens, the migration worker service 415 may perform one unit of data migration. The amount of data in the unit of data migration may be predetermined. A unit of migration may comprise a predetermined number of rows, a number of records, a percentage of data, an amount of time, or any other measurement of an amount of data migration. For example, the unit of migration may comprise 10,000 rows of data. In this example, each time the migration worker service 415 is called to perform one unit of migration, the migration worker service 415 may migrate 10,000 rows of data. In another example, the unit of migration may comprise 10% of the data in the shared database 440. In yet another example, the unit of migration may comprise one hour. In this example, the migration worker service 415 may perform data migration for one hour each time the migration worker service 415 is called.

After performing the unit of migration, the migration worker service 415 may return a status of the migration and/or continuation tokens or other data corresponding to the migration. If the migration has completed, for example, when there is no additional data in the shared database 440 to migrate, the migration worker service 415 may return an indication that the migration has been completed. If the migration is in progress, the migration worker service 415 may return an indication that migration is still in progress and/or continuation tokens indicating which portions of the shared database 440 have been migrated. If there was an error during the migration, the migration worker service 415 may return an indication that the migration should be restarted.

At step 830, the upgrade scheduler worker 410 may determine if the migration has been completed. If the upgrade scheduler worker 410 receives an indication that the migration is in progress, the upgrade scheduler worker 410 may sleep for a predetermined interval of time and then instruct the migration worker service 415 to perform another unit of migration. If the upgrade scheduler worker 410 receives an indication that the migration has been completed, then the upgrade scheduler worker may update the migration status table 493 to indicate that no migration is in progress. If the upgrade scheduler worker 410 receives an indication that there was an error during the data migration, the upgrade scheduler worker 410 may discard any continuation tokens related to the migration, such as those stored in the migration continuation tokens table 491, and restart the migration.

Figure 9:
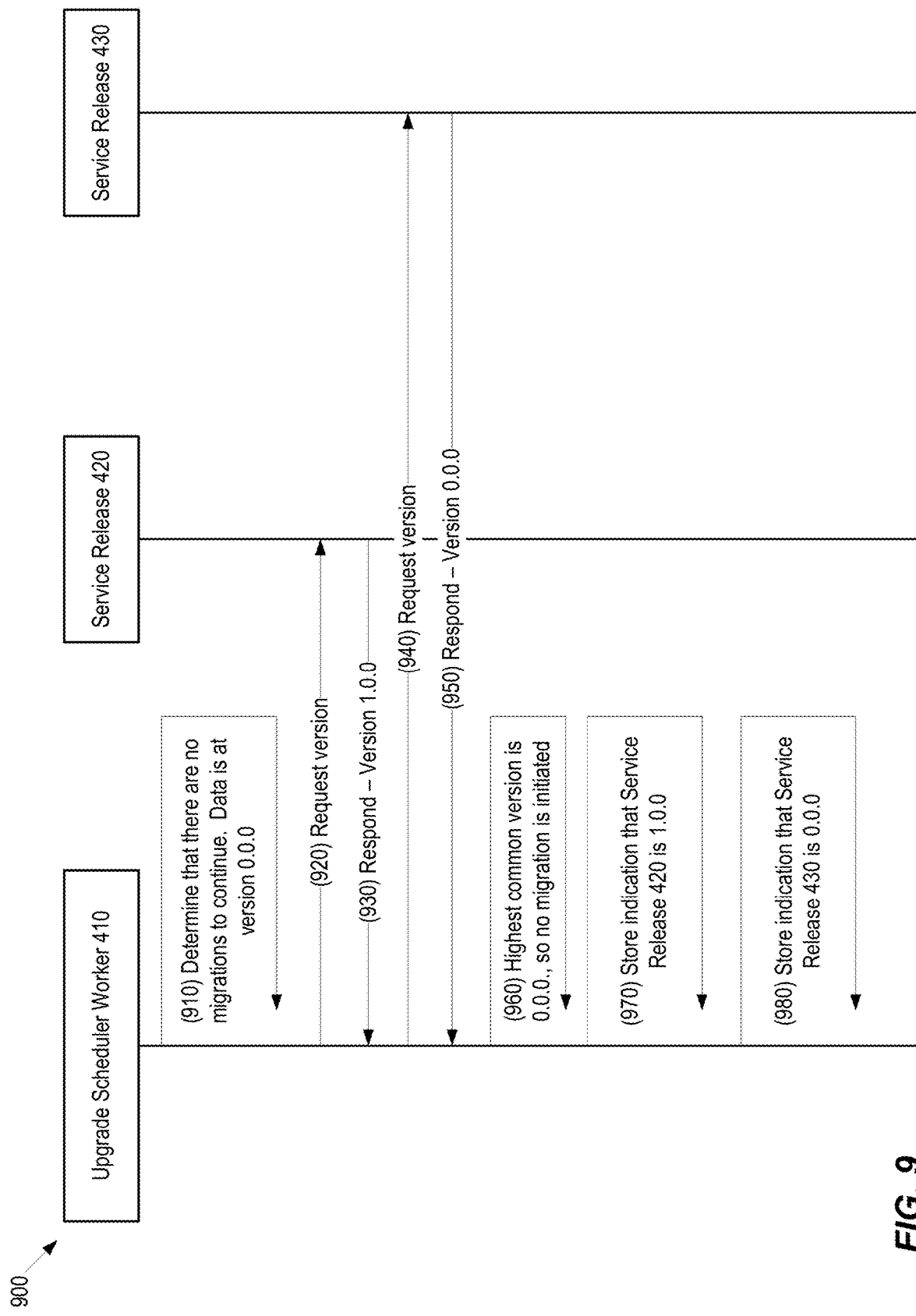
FIG. 9 is a diagram illustrating data migration operations for maintaining data at a highest common version according to one or more illustrative aspects of the disclosure.

FIG. 9 is a diagram 900 illustrating data migrations operations for maintaining data at a highest common version according to one or more illustrative aspects of the disclosure. In one or more embodiments, one or more steps illustrated in the diagram 900 may be performed by one or more computing devices or entities. For example, portions of the steps illustrated in the diagram 900 may be performed by one or more computing devices 201 or by the cloud computing environment 300. The steps illustrated in the diagram 900 may be embodied in computer-executable instructions that are stored in a computer-readable medium, such as a non-transitory computer readable medium. The steps illustrated in the diagram 900 need not all be performed in the order specified, and some steps may be omitted or changed in order.

At step 910, the upgrade scheduler worker 410 may determine that there are no migrations to continue and that data stored in the shared database 440 is at version 0.0.0. Actions performed at step 910 may be similar to those described above at step 510 of FIG. 5.

At step 920, the upgrade scheduler worker 410 may request the current version of the service release 420. At step 930, the service release 420 may respond to the request received at step 920. The service release 420 may respond with an indication that the service release 420 is implemented, and at version 1.0.0. Actions performed at steps 920 and 930 may be similar to those described above at steps 520 and 530 of FIG. 5.

At step 940, the upgrade scheduler worker 410 may request the current version of the service release 430. At step 950, the service release 430 may respond to the request received at step 940 with an indication that the service release 430 is implemented at version 0.0.0. Actions performed at steps 940 and 950 may be similar to those described above at steps 540 and 550 of FIG. 5.

At step 960, the upgrade scheduler worker may compare the version information received at steps 930 and 950 to stored version information in the service version table 492. The upgrade scheduler worker may determine that the service release 420 has been upgraded from version 0.0.0 to 1.0.0. The upgrade scheduler worker 410 may determine that both service releases 420 and 430 are implemented, and that there is a highest common version of 0.0.0. The upgrade scheduler worker 410 may compare the versions of service releases 420 and 430 to stored version information in the migration status table 493, which indicates an implemented schema version for the shared database 440. The upgrade scheduler worker 410 may determine that the highest common version has not changed, and that the shared database 440 is at version 0.0.0. Because the highest common version is the same as the currently implemented version, the upgrade scheduler worker 410 might not initiate a migration at step 960.

At steps 970 and 980, the upgrade scheduler worker 410 may store one or more records of the version information corresponding to service releases 420 and 430. The stored records may indicate that service release 420 is at version 1.0.0 and that service release 430 is at version 0.0.0. Actions performed at steps 970 and 980 may be similar to those described above at steps 560 and 570 of FIG. 5.

Figure 10:
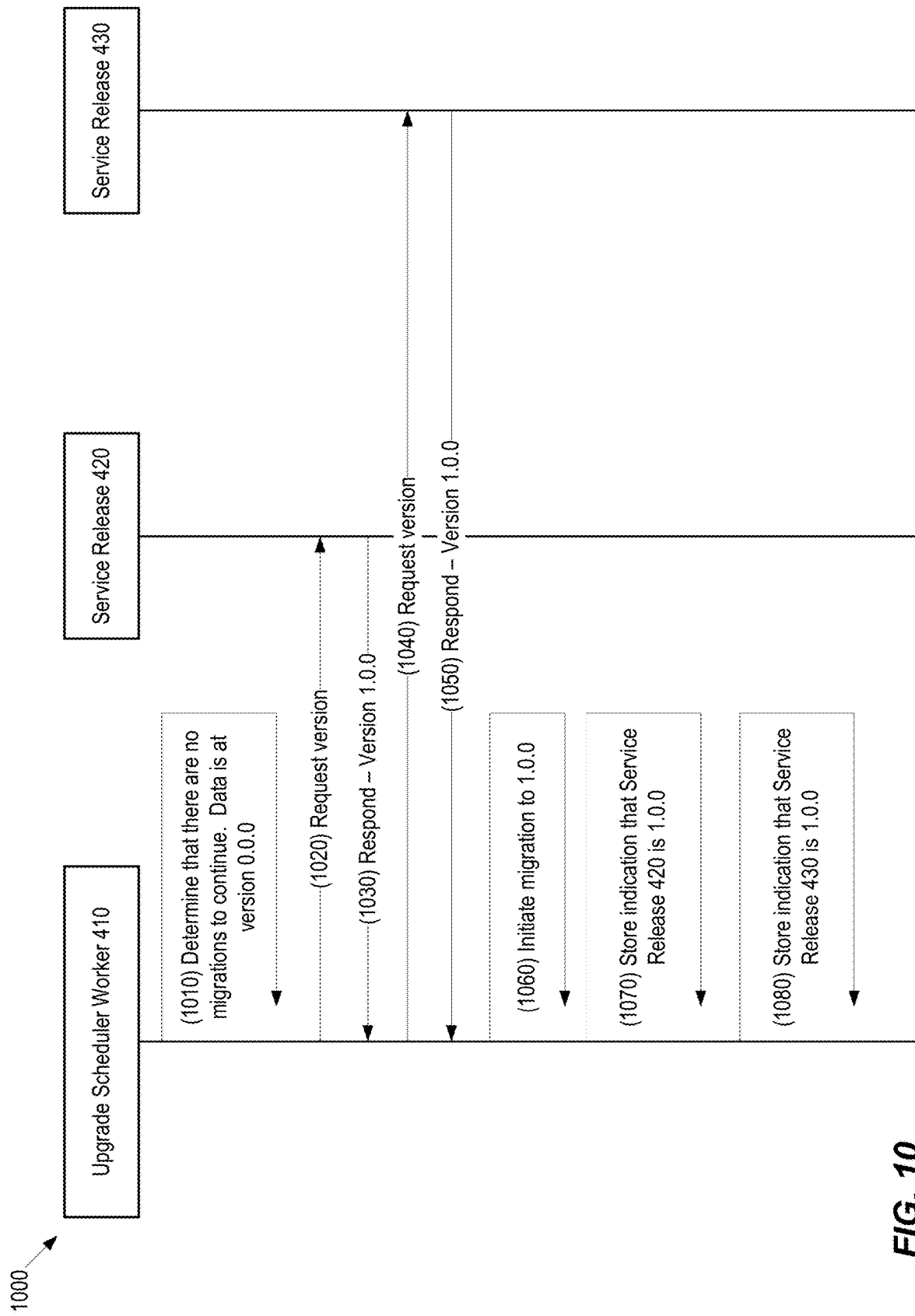
FIG. 10 is a diagram illustrating initiating a data migration according to one or more illustrative aspects of the disclosure.

FIG. 10 is a diagram 1000 illustrating initiating a data migration according to one or more illustrative aspects of the disclosure. In one or more embodiments, one or more steps illustrated in the diagram 1000 may be performed by one or more computing devices or entities. For example, portions of the steps illustrated in the diagram 1000 may be performed by one or more computing devices 201 or by the cloud computing environment 300. The steps illustrated in the diagram 1000 may be embodied in computer-executable instructions that are stored in a computer-readable medium, such as a non-transitory computer readable medium. The steps illustrated in the diagram 1000 need not all be performed in the order specified, and some steps may be omitted or changed in order.

At step 1010, the upgrade scheduler worker 410 may determine that there are no migrations to continue. Actions performed at step 1010 may be similar to those described above at step 510 of FIG. 5. At step 1020, the upgrade scheduler worker 410 may request the current version of the service release 420. At step 1030, the service release 420 may respond to the request received at step 1020. The service release 420 may respond with an indication that the service release 420 is implemented, and at version 1.0.0. Actions performed at steps 1020 and 1030 may be similar to those described above at steps 520 and 530 of FIG. 5.

At step 1040, the upgrade scheduler worker 410 may request the current version of the service release 430. At step 1050, the service release 430 may respond to the request received at step 1040 with an indication that the service release 430 is implemented at version 1.0.0. Actions performed at steps 1040 and 1050 may be similar to those described above at steps 540 and 550 of FIG. 5.

At step 1060, the upgrade scheduler worker 410 may determine that both service releases 420 and 430 are implemented, and that there is a highest common version of 1.0.0. The upgrade scheduler worker 410 may compare the highest common version to the stored version information in the migration status table, which indicates a current version of the shared database 440. The upgrade scheduler worker 410 may determine that the highest common version has changed from 0.0.0 to 1.0.0. After determining that the highest common version has changed, the upgrade scheduler worker 410 may initiate a migration of the shared database 440 to version 1.0.0. For example, the upgrade scheduler worker 410 may transmit an instruction to the migration worker service 415 to begin the migration. The instruction may comprise a data schema corresponding to version 1.0.0. Actions that may be performed by the migration worker service 415 are further described below in regards to FIG. 11.

At steps 1070 and 1080, the upgrade scheduler worker 410 may store one or more records of the version information corresponding to service releases 420 and 430. The stored records may indicate that service releases 420 and 430 are at version 1.0.0. The records may be stored in the service version table 492. Additionally, an indication that a migration is ongoing may be stored, for example, in the migration status table 493. Actions performed at steps 1070 and 1080 may be similar to those described above at steps 560 and 570 of FIG. 5.

FIG. 11 is a flow diagram of a method 1100 for managing data migration according to one or more illustrative aspects of the disclosure. In one or more embodiments, one or more steps illustrated in FIG. 11 may be performed by one or more computing devices or entities. For example, portions of the steps illustrated in FIG. 11 may be performed by one or more computing devices 201 or by the cloud computing environment 300. The steps illustrated in FIG. 11 may be embodied in computer-executable instructions that are stored in a computer-readable medium, such as a non-transitory computer readable medium. The steps illustrated in FIG. 11 need not all be performed in the order specified, and some steps may be omitted or changed in order. All or any portion of the steps illustrated in FIG. 11 may be performed by the upgrade scheduler worker 410.

At step 1110, a determination may be made as to whether a migration is ongoing for the service 400. The migration status table 493 may be accessed to determine whether a migration is ongoing. The migration status table 493 may indicate that a migration is ongoing or that no migration is currently in progress. If a determination is made that a migration is not ongoing, the method 1100 may proceed to step 1130, described below. If a migration is ongoing, the method may proceed to step 1120, at which point the migration worker service 415 may be called to perform a unit of migration. One or more continuation tokens may be retrieved and transmitted to the migration worker service 415. For example, the one or more continuation tokens may be retrieved from a migration continuation tokens table. After initiating the unit of migration at step 1120, the method 1100 may receive a response from the migration worker service 415 indicating a status of the migration, and react to the status as described below at step 1180. After receiving the status, the method 1100 may then proceed to step 1130.

At step 1130, a version number may be determined for each service release of the service. Actions performed at step 1130 may be similar to those described above at steps 520-550 of FIG. 5.

At step 1140, the version numbers received at step 1130 may be compared to stored version numbers to determine whether any of the service versions have been modified. The received version information may be compared to version information stored in the migration status table. If no version numbers have changed, then the method may proceed to step 1160 and sleep. The method 1100 may execute at a predetermined interval, and may sleep at step 1160 until the next scheduled execution of the method 1100. For example, the method 1100 may be performed hourly or daily If the version numbers have changed from previously stored version numbers, then, at step 1150, the version numbers received at step 1130 are stored. For example, the version numbers may be stored in the service version table 492.

At step 1170, a highest common version of the service releases may be compared to a current version of the shared data to determine whether a migration should be initiated. The version numbers received at step 1130 may be compared to each other to determine a highest common implemented version. A current implemented version of the data may be determined, for example, by accessing the migration status table 493. If the highest common version is different from the current implemented version, then a migration may be initiated to migrate the data to the highest common version implemented by the service releases 420 and 430. To begin the migration, a data schema corresponding to the highest common version may be transmitted to the migration worker service 415. The highest common version may be stored in the migration status table 493.

At step 1180, a status of the migration, initiated at step 1170, may be received. The status may indicate that the migration is complete, ongoing, or has resulted in an error. If the migration status is complete, the method may proceed to step 1190, where the migration status may be marked as complete, and any continuation tokens related to the migration may be deleted. For example, the migration status may be marked as complete in the migration status table 493, and the continuation tokens may be deleted from the migration continuation tokens table 491.

If the status received at step 1180 indicates that the migration is ongoing, continuation tokens for the ongoing migration may be received and stored, and then the method may proceed to step 1160 and sleep. If the status received at step 1180 indicates that there is an error, then the continuation tokens may be deleted, and the method may proceed to step 1160. In the case of an error, when the method 1100 wakes, after the predetermined interval, the method may restart the data migration.

As described above, at step 1160 the method may sleep until the method 1100 executes again at the predetermined interval. When the method wakes, the method may begin at step 1110.

Figure 12:
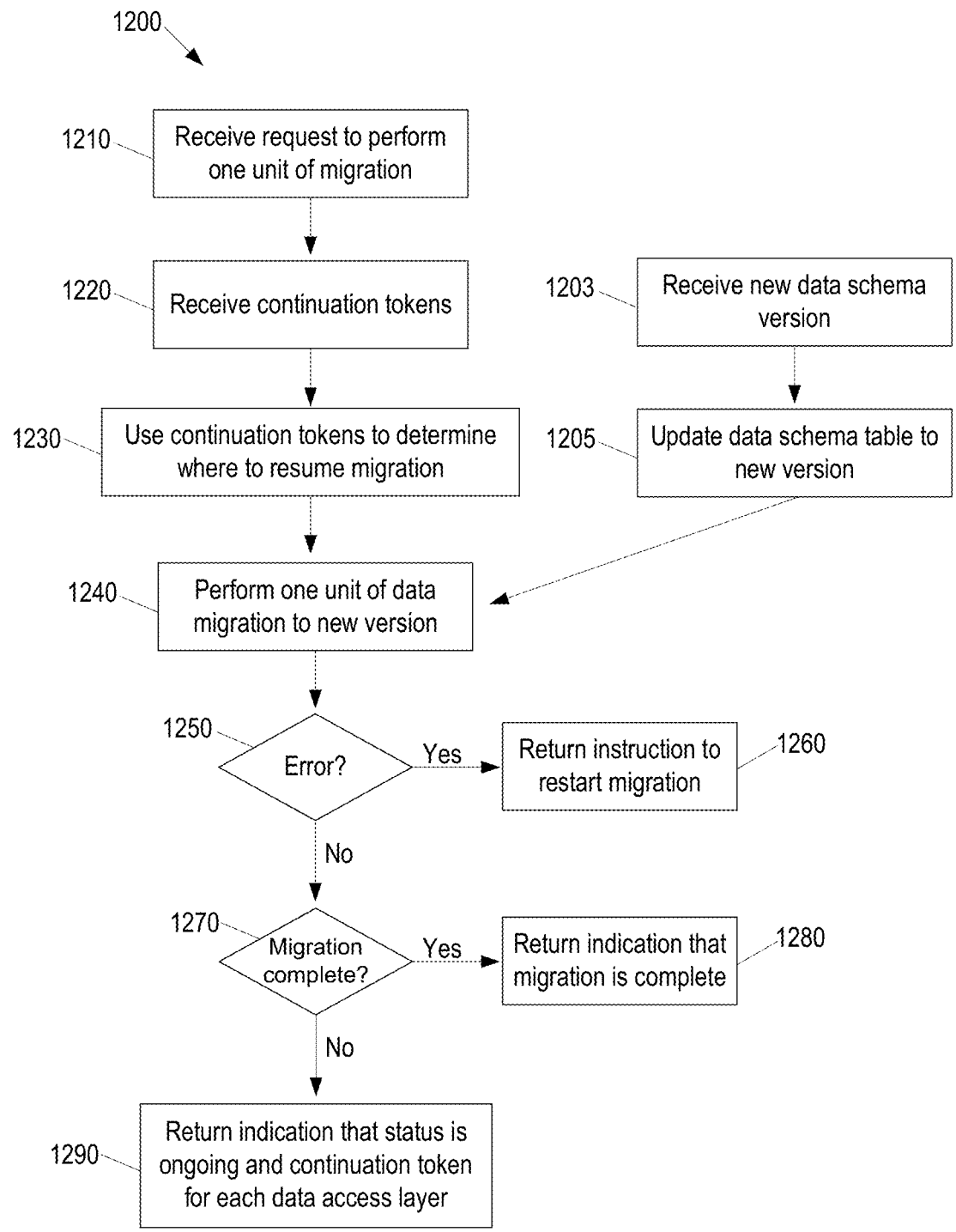
FIG. 12 is a flow diagram of a method for performing a unit of data migration according to one or more illustrative aspects of the disclosure.

FIG. 12 is a flow diagram of a method 1200 for initiating an update to a data schema according to one or more illustrative aspects of the disclosure. In one or more embodiments, one or more steps illustrated in FIG. 12 may be performed by one or more computing devices or entities. For example, portions of the steps illustrated in FIG. 12 may be performed by one or more computing devices 201 or by the cloud computing environment 300. The steps illustrated in FIG. 12 may be embodied in computer-executable instructions that are stored in a computer-readable medium, such as a non-transitory computer readable medium. The steps illustrated in FIG. 12 need not all be performed in the order specified, and some steps may be omitted or changed in order. All or any portion of the steps illustrated in FIG. 12 may be performed by the upgrade scheduler worker 410 and/or the migration worker service 415.

The method 1200 may be executed to continue an ongoing data migration, or to begin a new data migration. If the method 1200 is called to begin a new migration, the method 1200 may begin at step 1203. If the method 1200 is called to continue an ongoing migration, the method 1200 may begin at step 1210.

At step 1203, a data schema version may be received. The data schema version may indicate a structure for the data used by the service 400 and/or a structure for a database used by the service 400, such as the shared database 440. Prior to the version being received at step 1203, the data schema definition and/or rules indicated by the version may have already been incorporated in the data access layer of the service 400. The migration code for the data schema version may have already been incorporated in either the migration worker service 415 (if it is distinct from the service 400), or in the service 400 itself. The receiving of the version by the migration worker service 415 may act as a switch, which causes the worker service 415 and/or service 400 to begin migrating shared data to the version, and to start using the new data access layer code (such as for CRUD operations) corresponding to the version.

The data schema indicated by the version received at step 1203 may comprise one or more rules for data used by the service 400. For example, the data schema may comprise rules that indicate what types of data may be stored in various locations in the shared database 440. The data schema may indicate one or more relationships between rows, columns, cells, and/or tables in the shared database 440. For example, the data schema may indicate that data stored in a specified row of a table in the shared database 440 should comprise a numeral.

At step 1205, a data schema version table 490 corresponding to the service 400 may be updated using the received data schema. The received data schema may overwrite the previous data schema stored in the data schema version table 490. Alternatively, multiple data schema versions may be stored in the data schema version table 490. The data schema added to the data schema version table 490 at step 1205 may be marked as a current data schema used by the service 400. Service 400 may use this current data schema version to determine which version of data access layer code to use for CRUD operations, as described below in regards to FIG. 13.

As described above, for an ongoing migration, the method 1200 may begin at step 1210, where a request is received to perform one unit of migration. At step 1220, continuation tokens corresponding to the request may be received. The continuation tokens may be retrieved from the migration continuation tokens table 491 or may be received in the request made from the upgrade scheduler worker 410. A dictionary of continuation tokens may be received or retrieved. The continuation tokens may have previously been created after completing a unit of migration. The continuation tokens may indicate where, in the shared database 440, the last unit of migration ended. For example, the continuation tokens may indicate a row number for each table in the shared database 440.

At step 1230, the continuation tokens may be used to determine where to resume migration. The starting point of the next unit of migration to be performed may be determined using the continuation tokens.

At step 1240, one unit of migration may be performed. One unit of migration may be performed for each data access layer of the service 400. If the method proceeded to step 1240 from step 1230, then the unit of migration may be performed beginning at the locations determined at step 1230. If the method proceeded to step 1240 from step 1205, then the unit of migration may be performed at a beginning of the shared database 440, or at a predetermined location in the shared database 440. For each row migrated in the unit of migration, a column of the table, such as a data schema version column, may indicate a current version of the row. Based on the row, appropriate migration code in the service release 420 or service release 430 may be selected to migrate the row to the highest common version. For example, if data stored in a row is at version 1.1, and the highest common version is 1.3, then data migration code corresponding to upgrading from version 1.1 to version 1.3 may be located and used to perform the data migration on that row. If the data schema version of a row is equal to or higher than the highest common version, that row may be skipped. After a row has been migrated to a new version, the cell in the data schema version column corresponding to that row may be updated to indicate the highest common version, e.g., the version that the row has been migrated to. The data migration code may be behind a version check.

At step 1250, the method 1200 may determine whether an error has occurred while performing the unit of migration. If an error occurs while migrating the data, at step 1260 an instruction may be returned to restart the migration. The instruction may cause any continuation tokens related to the migration to be deleted.

If no error occurred during the unit of migration, the method may proceed to step 1270, where the method 1200 may determine whether the migration is complete. If all records are updated and/or the migration has reached the end of all tables associated with the service 400, then the migration may be complete and the method 1200 may proceed to step 1280. At step 1280, method 1200 may return an indication that the migration has been completed. The migration status table 493 may be updated to indicate that there is no ongoing migration for the service 400.

If all records in the shared database 440 have not been updated and/or the migration has not reached the end of all tables associated with the service, then the method 1200 may proceed to step 1290. At step 1290, an indication that the migration is ongoing may be returned and/or one or more continuation tokens may be returned. A continuation token for each data access layer may be returned, or a single continuation token comprising an indication of a location within each data access layer may be returned. The one or more continuation tokens may be stored in the migration continuation tokens table 491.

Figure 13:
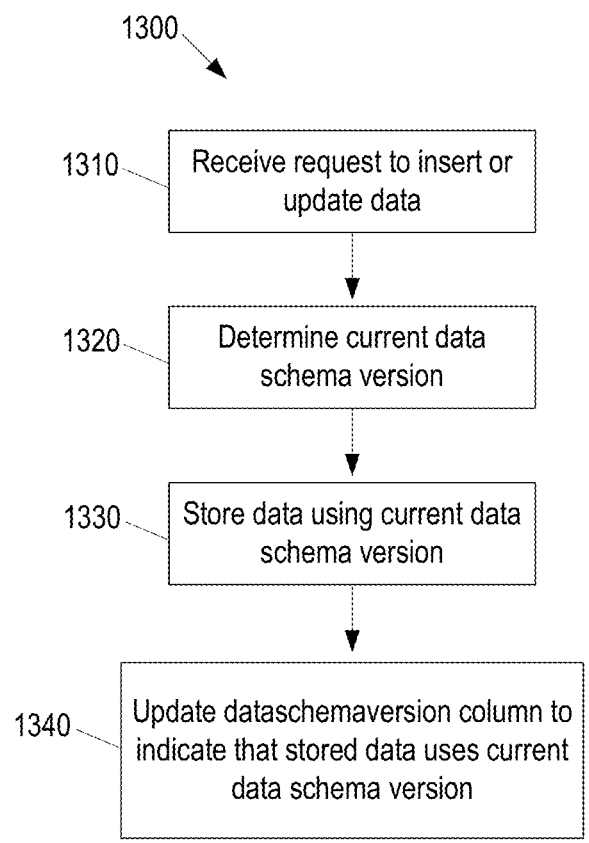
FIG. 13 is a flow diagram of a method for inserting or updating data according to one or more illustrative aspects of the disclosure.

FIG. 13 is a flow diagram of a method 1300 for inserting or updating data according to one or more illustrative aspects of the disclosure. In one or more embodiments, one or more steps illustrated in FIG. 13 may be performed by one or more computing devices or entities. For example, portions of the steps illustrated in FIG. 13 may be performed by one or more computing devices 201 or by the cloud computing environment 300. The steps illustrated in FIG. 13 may be embodied in computer-executable instructions that are stored in a computer-readable medium, such as a non-transitory computer readable medium. The steps illustrated in FIG. 13 need not all be performed in the order specified, and some steps may be omitted or changed in order. All or any portion of the steps illustrated in FIG. 12 may be performed by instances of the service, such as instances 450-480.

The method 1300 may be used to ensure that data operations performed on the shared database 440 are consistent with a current data schema version for the shared database 440. For example, if a migration is in progress, data operations on the shared database 440 may be performed using the data schema version that the shared database 440 is being migrated to, and not the data schema version that was previously implemented. This may ensure that, when the migration is complete, all rows in the shared database 440 will have been migrated to the new data schema version. For example, if an insert operation occurs at a point above the last continuation token, that insert operation would be processed using the new code corresponding to the version the service is being migrated to, so that row will not be skipped and left at an earlier schema version.

At step 1310, a request may be received to insert data in the shared database 440, update data in the shared database 440, or perform any other data operations on the shared database 440. An instance of the service, such as one of instances 450-480, may be performing a data operation, such as a write, on the shared database 440.

At step 1320, the current data schema version of the database may be determined. The data schema version table 490 may comprise an indication of the current data schema version implemented by the service. If the service is currently being migrated to a data schema version, the data schema version table 490 may indicate the version that the service is currently being migrated to, regardless of whether or not all data in the shared database 440 is compatible yet with this version of the data schema. The current data schema version may be stored in a context object, to avoid repeated calls to the data schema version table 490.

At step 1330, the data operation may be performed using the current data schema version determined at step 1320. Data access layer methods corresponding to the current data schema version may be used to perform the data operation. A version check may be performed to confirm that a data access layer method corresponds to the current data schema version. When a new schema version is introduced, changes to the data access layer code to comply with the new version may be added to the appropriate data access layers. The data access layer code may be placed behind a version check.

At step 1340, the shared database 440 may be modified to indicate that the data modified or inserted at step 1330 is compatible with the current data schema version. One or more cells in a data schema version column may be modified. For example, if data was modified in row 1440 of a table at step 1330, and the current data schema version is 3.2.9, then a cell at row 1440 of the data schema version column may be updated to indicate version 3.2.9.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   determining, for a plurality of release versions of a service, sets of data schema of the service that include at least one data schema of a release version of the service, the at least one data schema being compatible with another release version of the service, a data schema being indicative of a data version of a portion of a database of the service;
   determining, using the sets of data schema of the service, a common data schema compatible with the plurality of release versions of the service; and
   updating at least a portion of the database to the common schema to implement the service so that the service is executable with use of the plurality of release versions compatible with the common schema, wherein the updating is performed in response to a determination that the common data schema is higher than a currently implemented data schema of the service.

2. The method of claim 1, further comprising causing the plurality of release versions of the service to perform data operations on the database at the common data schema.

3. The method of claim 1, further comprising:
   storing an indication that the service is updating to the common data schema.

4. The method of claim 1, wherein updating at least a portion of the database to the common data schema comprises:
   causing one or more rows of the database to be updated to the common data schema;
   receiving an indication that an error occurred during the update; and
   restarting the update.

5. The method of claim 1, wherein updating at least a portion of the database to the common data schema comprises:
   causing a first portion of the database to be updated to the common data schema;
   receiving one or more continuation tokens, wherein the one or more continuation tokens indicate the first portion; and
   causing a second portion of the database to be updated to the common data schema.

6. The method of claim 1, wherein updating at least a portion of the database to the common data schema comprises:
   determining, for each row of the database, whether the row is below the common data schema; and
   converting, to the common data schema, each row of the database that is below the common data schema.

7. The method of claim 1, wherein a first portion of users of the service are directed to a first release version of the service, and wherein a second portion of the users are directed to a second release version of the service.

8. The method of claim 1, wherein determining the sets of data schema comprises:
   determining addresses corresponding to the plurality of release versions; and
   querying the addresses for data schema information indicating the compatibility of a release version with a set of data schema.

9. A method comprising:
   determining for a plurality of release versions of a service, sets of data schema of the service that include at least one data schema of a release version of the service, the at least one data schema being compatible with another release version of the service, a data schema being indicative of a data version of a portion of a database of the service;
   determining, using the sets of data schema of the service, a common data schema compatible with the plurality of release versions of the service;
   in response to a determination that the common data schema is higher than a current data schema of the service, initiating an update, for the service, to the common data schema; and
   instructing the plurality of release versions to use data access layer methods compatible with the common data schema.

10. The method of claim 9, wherein instructing the plurality of release versions to use the data access layer methods compatible with the common data schema comprises modifying a stored indicator of the current data schema of the service to indicate the common data schema.

11. The method of claim 9, wherein determining the common data schema comprises determining that the plurality of release versions can perform read or write operations at the common data schema.

12. The method of claim 9, wherein determining the common data schema comprises determining that the plurality of release versions comprise code for performing read or write operations at the common data schema.

13. The method of claim 9, wherein initiating the update comprises updating one or more records, stored in the database of the service, to the common data schema.

14. The method of claim 13, wherein the database comprises a shared database accessed by one or more instances of the of the plurality of release versions.

15. A method comprising:
   determining, for a plurality of release versions of a service, sets of data schema of the service that include at least one data schema of a release version of the service, the at least one data schema being compatible with another release version of the service, a data schema being indicative of a data version of a portion of a database of the service;
   determining, using the sets of data schema of the service, a common data schema compatible with the plurality of release versions of the service;
   in response to a determination that the common data schema is higher than a current data schema of the service, initiating a first portion of an update, for the service, to the common data schema;
   receiving one or more continuation tokens corresponding to the update;
   initiating a second portion of the update;
   receiving an indication that an error occurred during the second portion of the update;
   deleting the one or more continuation tokens; and
   restarting the update.

16. The method of claim 15, wherein initiating the second portion of the update comprises initiating, using the one or more continuation tokens, the second portion of the update.

17. The method of claim 15, further comprising storing the one or more continuation tokens in a dictionary, and wherein deleting the one or more continuation tokens comprises deleting the dictionary.

18. The method of claim 15, wherein initiating the first portion of the update comprises transmitting an instruction to perform the update on a predetermined number of rows of the database of the service.

19. The method of claim 15, wherein initiating the first portion of the update comprises transmitting a data schema corresponding to the common data schema.

20. The method of claim 1, further comprising implementing a data access layer method compatible with the common schema.

21. A method comprising determining:
comparing first data schema information indicating compatibility of a first release version of a service with a first set of data schema versions of a database of the service, to second data schema information indicating compatibility of a second release version of the service with a second set of data schema versions of the database, wherein the first set and the second set have at least one common data schema version, to determine a highest common data schema version of the first release version and the second release version;

in response to a determination that the highest common data schema version is higher than a current data schema version of the service, initiating a first portion of a migration, for the service, to the highest common data schema version; and initiating a second portion of migration based on one or more continuation tokens indicating which portions of the database have already been migrated, wherein a separate continuation token is generated for each data access layer of the service.

22. The method of claim 21, wherein each continuation token comprises a partition key and/or a row key.

* * * * *